(12) United States Patent
Yasuhara et al.

(10) Patent No.: US 7,641,236 B2
(45) Date of Patent: Jan. 5, 2010

(54) VEHICLE BODY BOTTOM STRUCTURE

(75) Inventors: Shigeto Yasuhara, Wako (JP); Yasuhisa Egawa, Wako (JP); Toshiaki Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 310 days.

(21) Appl. No.: 11/675,259

(22) Filed: Feb. 15, 2007

(65) Prior Publication Data

US 2007/0187994 A1 Aug. 16, 2007

(30) Foreign Application Priority Data

Feb. 16, 2006 (JP) .............................. 2006-040001

(51) Int. Cl.
*B62D 21/00* (2006.01)
(52) U.S. Cl. ....................... 280/781; 280/793; 280/794; 280/795
(58) Field of Classification Search ................ 280/781, 280/793, 794, 795
See application file for complete search history.

(56) References Cited

U.S. PATENT DOCUMENTS

| | | | | |
|---|---|---|---|---|
| 2,314,603 A * | 3/1943 | Sorensen et al. | ............ | 280/794 |
| 2,476,664 A * | 7/1949 | Humig | ................ | 280/124.111 |
| 2,715,041 A * | 8/1955 | Fierbaugh et al. | .......... | 296/35.1 |
| 2,844,864 A * | 7/1958 | Schilberg | ................. | 29/897.35 |
| 2,939,719 A * | 6/1960 | Parker | ........................ | 280/793 |
| 2,963,300 A * | 12/1960 | Purdy | ......................... | 280/793 |
| 2,972,498 A * | 2/1961 | Kelley | ........................ | 296/204 |
| 3,000,650 A * | 9/1961 | Burrows | ..................... | 280/793 |
| 3,108,836 A * | 10/1963 | Deckert | ...................... | 296/204 |
| 3,115,350 A * | 12/1963 | Quick, Jr. | ................... | 280/793 |
| 3,266,591 A * | 8/1966 | Sampietro et al. | .......... | 180/68.1 |
| 3,499,661 A * | 3/1970 | Rowe, Jr. | .................... | 280/794 |
| 4,941,680 A * | 7/1990 | Baiker | ........................ | 280/793 |

FOREIGN PATENT DOCUMENTS

JP 2005-119492 5/2005

* cited by examiner

*Primary Examiner*—Toan C To
(74) *Attorney, Agent, or Firm*—Rankin, Hill & Clark LLP

(57) ABSTRACT

A high-rigidity, light-weight bottom structure for a vehicle body is disclosed. The structure comprises a rectangular framework and an X-shaped frame member positioned inside the rectangular framework. The framework in the vicinity of an area where front wheels or rear wheels are provided is formed by a triangular frame part.

1 Claim, 7 Drawing Sheets

VEHICLE BODY BOTTOM STRUCTURE

FIELD OF THE INVENTION

The present invention relates generally to a bottom structure for a vehicle body and, in particular, to such a bottom structure for supporting left and right front wheels and left and right rear wheels.

BACKGROUND OF THE INVENTION

Such a bottom structure for a vehicle body typically comprises left and right side sills, left and right rear side frames extending from a rear part of the left and right side sills toward a rear part of the vehicle body, a first cross member that extends between the left and right side sills and that is connected to front end parts of the left and right rear side frames, and a second cross member that is rearward of the first cross member and extends across the left and right rear side frames so as to be positioned between left and right rear wheels.

In the bottom structure for a vehicle body, the left and right rear side frames, first cross member, and second cross member form a rectangular frame. Accordingly, a force from the rear wheels acts upon the second cross member of the rectangular frame in a width direction of the vehicle when the vehicle turns. For this reason, the bottom structure for a vehicle body must be kept rigid in order to prevent the rectangular frame from being deformed by the force from the rear wheels.

Therefore, a structure for a vehicle body is proposed in JP-A-2005-119492 that comprises a plurality of cross members in the vicinity of the second cross member in order to keep the bottom structure for a vehicle body rigid.

However, the bottom structure for a vehicle body of JP-A-2005-119492 comprises a plurality of cross members in the vicinity of the second cross member. Therefore, the bottom structure for a vehicle body has a complex configuration, which prevents the bottom structure from being made lighter.

SUMMARY OF THE INVENTION

It is therefore an object of the present invention to provide a bottom structure for a vehicle body whereby the structure can be kept rigid and weight can be reduced.

According to the present invention, there is provided a bottom structure for a vehicle body, which comprises: a rectangular framework having a substantially rectangular shape, the framework being comprised of left and right side frames extending longitudinally of the vehicle body, a front cross member extending between front end parts of the left and right side frames, and a rear cross member extending between rear end parts of the left and right side frames; an X-shaped frame member comprised of a first frame extending from the front end part of the left side frame to the rear end part of the right side frame toward the rear of the vehicle body, and a second frame extending from the front end part of the right side frame to the rear end part of the left side frame toward the rear of the vehicle body in such a manner as to intersect in a substantially X-shaped configuration in the rectangular framework; left and right front wheel support units provided to left and right front end parts of the X-shaped frame member for supporting left and right front wheels; and left and right rear wheel support units provided to left and right rear end parts of the X-shaped frame member for supporting left and right rear wheels.

In the bottom structure thus arranged, a substantially triangular front frame part can be formed in a front half of the X-shaped frame member, and a substantially triangular rear frame part can be formed in the rear half of the X-shaped frame member. The triangular front frame part is formed in the front half of the rectangular framework, and the triangular rear frame part is formed in the rear half of the rectangular framework.

The front half of the rectangular framework is provided with the triangular front frame part, whereby the front half of the rectangular framework can be kept rigid, and, when the front part of the bottom structure for a vehicle body is subjected to a lateral force in the width direction of the vehicle, the triangular front frame part prevents the front half of the rectangular framework from deforming in the width direction of the vehicle.

The rear half of the rectangular framework is similarly provided with the triangular rear frame part, whereby the rear half of the rectangular framework can be kept rigid, and, when the rear part of the bottom structure for a vehicle body is subjected to a lateral force in the width direction of the vehicle, the triangular rear frame part prevents the rear half of the rectangular framework from deforming in the width direction of the vehicle.

The X-shaped frame member, which is a base for the front and triangular rear frame parts, is a simple member formed into a substantially X-shaped configuration by the first and second frames. For this reason, the bottom structure for a vehicle body is kept rigid, and the bottom structure for a vehicle body can be made lighter.

Preferably, the left and right front end parts of the X-shaped frame member comprise a front impact absorption unit for absorbing an impact received from a front side of the vehicle body, while the left and right rear end parts of the X-shaped frame member comprise a rear impact absorption unit for absorbing an impact received from a rear side of the vehicle body.

With this arrangement, when the front part of the vehicle body is subjected to an impact force, the front impact absorption unit will collapse, whereby the impact force is absorbed. In addition, when the rear of the vehicle body is subjected to an impact force, the rear impact absorption unit will collapse, whereby the impact force is absorbed. Thus, when the front part or rear part of the vehicle body is subjected to an impact force, the front and rear frame parts will absorb the impact, thereby allowing the impact force acting on the X-shaped frame member to be minimized.

Desirably, the bottom structure includes a triangular frame part located closely to the front wheels and/or the rear wheels. Thus, the frame part is formed into a triangular shape, whereby strength and rigidity are increased by a simple configuration, and the frame structure of the vehicle body is made lighter. In a preferred form, the frame parts are configured to form, for example, three alternate triangular shapes.

BRIEF DESCRIPTION OF THE DRAWINGS

Certain preferred embodiments of the present invention will be described in detail below, by way of example only, with reference to the accompanying drawings, in which:

FIG. 4A is a schematic view showing an impact force being absorbed and dispersed when a right front part of the vehicle body bottom structure is subjected to the impact force while

FIG. 5A is a schematic view showing an impact force being absorbed and dispersed when a left side surface of the bottom structure for a vehicle body is subjected to the impact force while

DETAILED DESCRIPTION OF THE PREFERRED EMBODIMENTS

Figure 1:
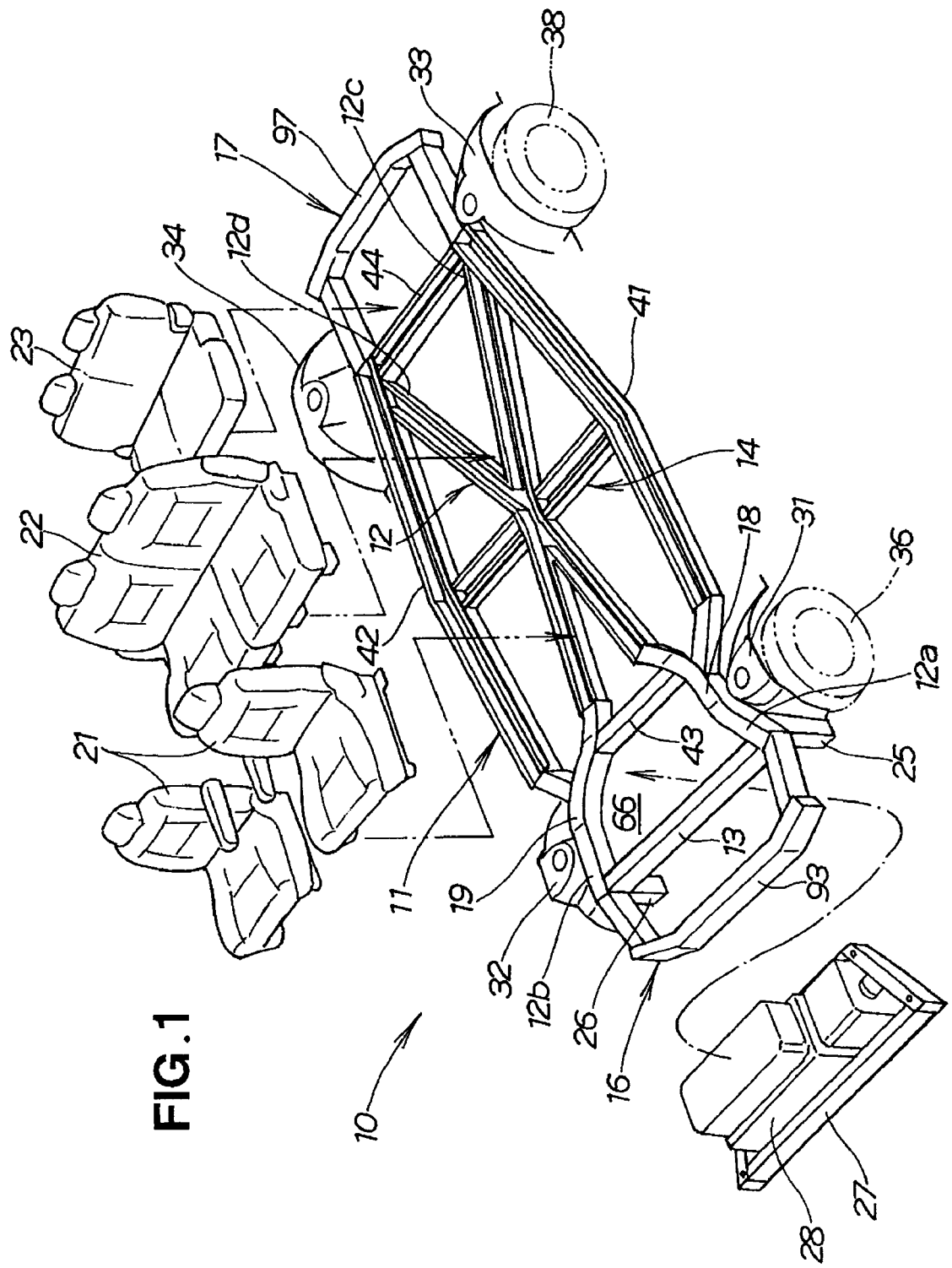
FIG. 1 is a perspective view showing a vehicle body bottom structure according to a first embodiment of the present invention.
Figure 2:
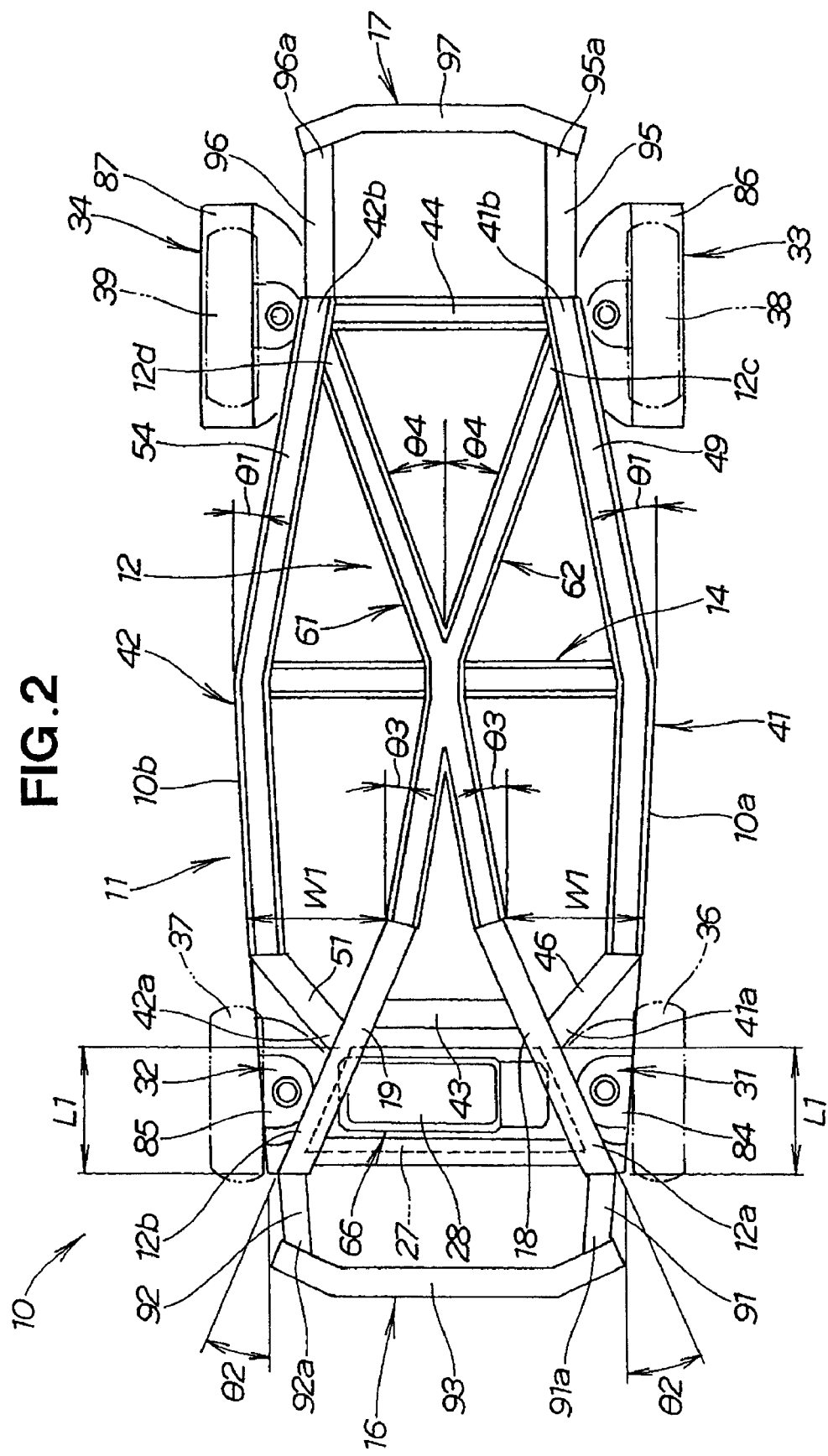
FIG. 2 is a top plan view showing the vehicle body bottom structure of FIG. 1.
Figure 3:
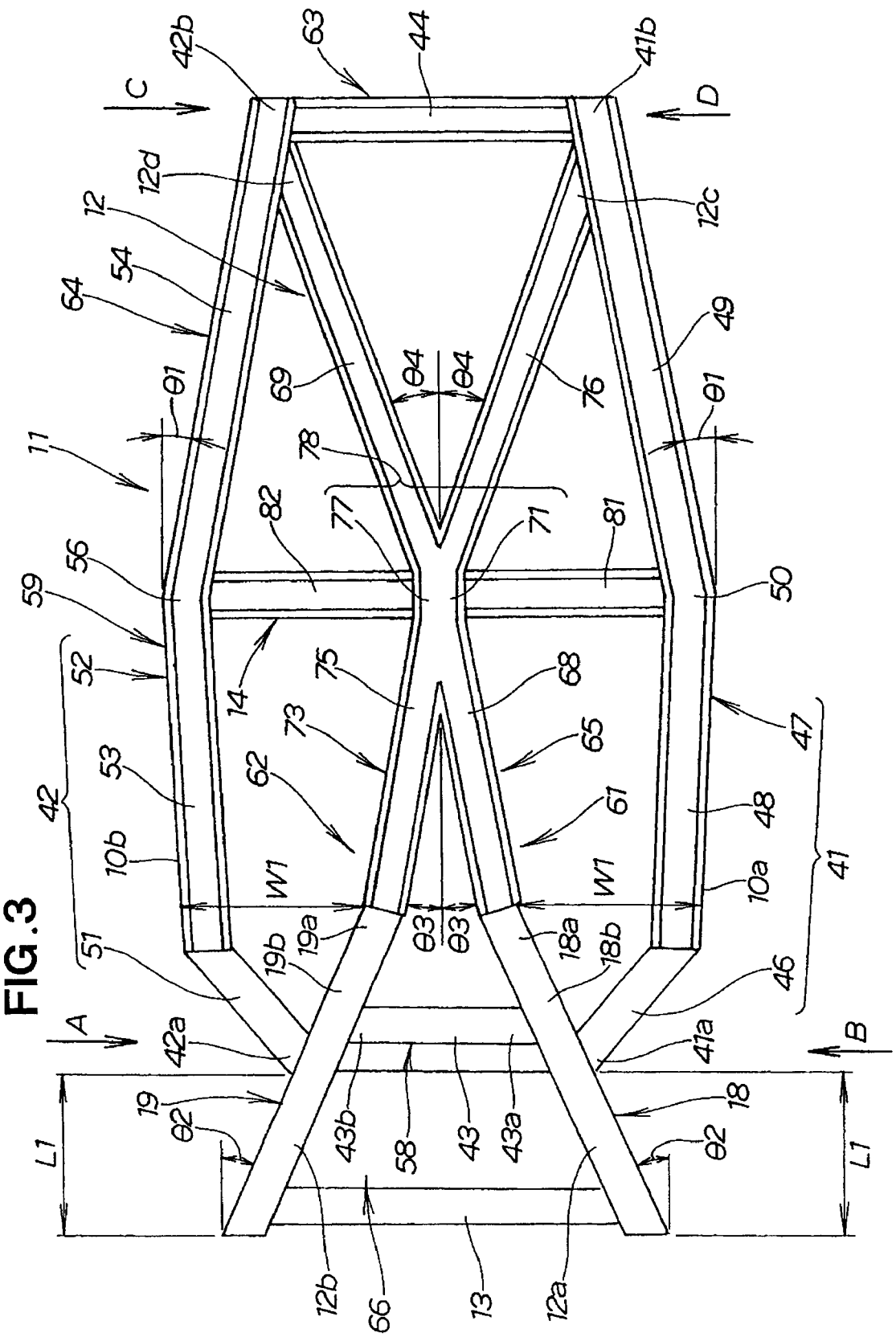
FIG. 3 is a top plan view showing on an enlarged scale the vehicle body bottom structure of FIG. 2.

Reference is initially made to FIGS. 1 through 3 inclusive, illustrating a vehicle body bottom structure according to a first embodiment.

As shown in FIG. 1, the bottom structure 10 for a vehicle body comprises a rectangular framework 11 formed on an exterior frame of a vehicle body; an X-shaped frame member 12 formed into a substantially X-shaped configuration in the rectangular framework 11; a first cross member 13 extending between left and right front end parts 12a, 12b of the X-shaped frame member 12; a center cross member 14 that extends between the rectangular framework 11 and is connected at a central part of the X-shaped frame member 12; a front impact absorption unit 16 provided to the left and right front end parts 12a, 12b of the X-shaped frame member 12; and a rear impact absorption unit 17 provided to the left and right rear end parts 12c, 12d of the X-shaped frame member 12.

A floor panel (not shown) is mounted on the bottom structure 10 for a vehicle body, a pair of front seats 21, 21 is provided to a front end part of the floor panel, a second seat 22 is provided to a central part, and a third seat 23 is provided to a rear end part. The bottom structure 10 can be applied to, for example, a minivan or another vehicle having a flat floor surface.

Leg parts 25, 26 extend downward from the left and right front end parts 12a, 12b of the X-shaped frame member 12. A sub-frame 27 is mounted from below to the left and right leg parts 25, 26 and to left and right front side frames 18, 19 of the X-shaped frame member 12. An engine/transmission unit 28 is mounted to the sub-frame 27.

The left and right front side frames 18, 19 shall be described below.

The bottom structure 10 for a vehicle body comprises left and right front wheel support units 31, 32 provided to the left and right front side frames 18, 19 of the X-shaped frame member 12, respectively; and left and right rear wheel support units 33, 34 provided to the left and right rear end parts 12c, 12d of the X-shaped frame member 12, respectively.

The left and right front wheel support units 31, 32 support left and right front wheels 36, 37 (see FIG. 2 for the right front wheel support unit 37), respectively.

The left and right rear wheel support units 33, 34 support left and right rear wheels 38, 39 (see FIG. 2 for the right rear wheel support unit 39), respectively.

As shown in FIG. 2, the rectangular framework 11 is composed of left and right side frames 41, 42 extending in a longitudinal direction of the vehicle body; a second front cross member (front cross member) 43 extending between front end parts 41a, 42a of the left and right side frames 41, 42; and a rear cross member 44 extending between rear end parts 41b, 42b of the left and right side frames 41, 42; and is formed into a shape that is substantially rectangular when viewed in a plane.

The X-shaped frame member 12 is formed into a substantially X-shaped configuration in the rectangular framework 11 by a first frame 61 and a second frame 62.

The first frame 61 extends toward the rear of the vehicle body from a left front part of the vehicle body to the rear end part 42b of the right side frame 42 via the front end part 41a of the left side frame 41. The second frame 62 extends toward the rear of the vehicle body from a right front part of the vehicle body to the rear end part 41b of the left side frame 41 via the front end part 42a of the right side frame 42.

The left side frame 41 comprises a left outrigger part 46 extending toward the rear of the vehicle body from the left front side frame 18 of the X-shaped frame member 12, and a left side floor frame part 47 extending from a rear end part of the left outrigger part 46 to the left rear end part 12c of the X-shaped frame member 12, as shown in FIG. 3.

The left outrigger part 46 extends from the left front side frame 18 of the X-shaped frame 12 toward the rear of the vehicle body so as to be inclined toward the outside of the vehicle body.

The left side floor frame part 47 has a front half region (referred to below as the "left front half region") 48 extending in the longitudinal direction of the vehicle body from the rear end part of the left outrigger part 46 to the center cross member 14, and a rear half region (referred to below as the "left rear half region") 49 extending from a rear end part of the left front half region 48 to the left rear end part 12c of the X-shaped frame member 12 so as to be inclined inward in the longitudinal direction of the vehicle body.

The rear end part of the left front half region 48 and a front end part of the left rear half region 49 form a left joint 50.

The left rear half region 49 is inclined inward in the width direction of the vehicle toward the rear of the vehicle body at an angle θ1. The angle θ1 is set so that the left rear half region 49 will clear the left rear wheel support unit 33 (FIG. 2).

The right side frame 42 comprises a right outrigger 51 extending toward the rear of the vehicle body from the right front side frame 19 of the X-shaped frame member 12, and a right side floor frame part 52 extending from a rear end part of the right outrigger 51 to the right rear end part 12d of the X-shaped frame member 12.

The right outrigger part 51 extends toward the rear of the vehicle body from the right front side frame 19 of the X-shaped frame member 12 so as to be inclined toward the outside of the vehicle body.

The right side floor frame part 52 has a front half region (referred to below as the "right front half region") 53 extending in the longitudinal direction of the vehicle body from a rear end part of the right outrigger part 51 to the center cross member 14, and a rear half region (referred to below as the "right rear half region") 54 extending from a rear end part of the right front half region 53 to the right rear end part 12d of the X-shaped frame 12 so as to be inclined inward in the longitudinal direction of the vehicle body.

The rear end part of the right front half region 53 and a front end part of the right rear half region 54 form a right joint 56.

The right rear half region 54 is inclined inward in the width direction of the vehicle toward the rear of the vehicle body at the angle θ1. The angle θ1 is set so that the right rear half region 54 will clear the right rear wheel support unit 34.

Thus, the left and right side frames 41, 42 are laterally symmetrical members.

The second front cross member 43 of the rectangular framework 11 extends between the left and right front side frames 18, 19 of the X-shaped frame member 12. A left end part 43a of the second front cross member 43 is disposed slightly closer to the rear part of the vehicle body than the front end part 41a of the left outrigger part 46. The left end part 43a of the second front cross member 43 is connected to the front end part 41a of the left outrigger part 46 via the left front side frame 18 of the X-shaped frame member 12. A right end 43b of the second front cross member 43 is disposed slightly closer to the rear part of the vehicle body than the front end part 42a of the right outrigger part 51. The right end 43b of the second front cross member 43 is connected to the front end part 42a of the right outrigger part 51 via the right front side frame 19 of the X-shaped frame member 12.

In other words, the second front cross member 43 extends between the front end parts 41a, 42a of the left and right side frames 41, 42 via the left and right front side frames 18, 19 of the X-shaped frame member 12 and, specifically, extends between the front end parts 41a, 42a of the left and right outrigger parts 46, 51.

The rear cross member 44 extends between the rear end parts of the left and right rear half regions 49, 54; and, specifically, extends between the rear end parts 41b, 42b of the left and right side frames 41, 42.

The first frame 61 of the X-shaped frame member 12 comprises the abovementioned left front side frame 18, and a first floor frame part 65 extending from a rear end part 18a of the left front side frame 18 to the rear end part 42b of the right side frame 42.

The front end part 12a of the left front side frame 18 is positioned in a substantially outermost region 10a on the left side of the vehicle body, and protrudes forward from the left outrigger part 46 to a distance L1. The rear end part 18a is positioned so as to enter into the vehicle body from the outermost region 10a on the left side of the vehicle body to a distance W1.

Specifically, the left front side frame 18 is inclined inward in the width direction of the vehicle toward the rear of the vehicle body at an angle θ2. The angle θ2 is set so that the left front side frame 18 will clear the left front wheel support unit 31 (FIG. 2) and so that an engine compartment 66 can be accommodated.

The first floor frame part 65 has a front half region (referred to below as the "first front half region") 68 extending from the rear end part 18a of the left front side frame 18 to the center cross member 14, and a rear half region (referred to below as the "first rear half region") 69 extending from a rear end part of the first front half region 68 to the rear end part 42b of the right side frame 42.

The first front half region 68 is inclined inward in the width direction of the vehicle toward the rear part of the vehicle body at an angle θ3 and is bonded to a central part of the center cross member 14. The angle θ2 of the left front side frame 18 is greater than the angle θ3 of the first front half region 68. The two angles are related so that θ2>θ3.

The first rear half region 69 is inclined inward in the width direction of the vehicle toward the rear part of the vehicle body at an angle θ4. The angle θ4 of the first rear half region 69 is greater than the angle θ3 of the first front half region 68. The two angles are related so that θ4>θ3.

The rear end part of the first front half region 68 and the front end part of the first rear half region 69 form a first joint 71.

The second frame 62 of the X-shaped frame member 12 comprises the abovementioned right front side frame 19, and a second floor frame part 73 extending from a rear end part 19a of the right front side frame 19 to the rear end part 41b of the left side frame 41. The second frame 62 is laterally symmetrical to the first frame 61.

The front end part 12b of the right front side frame 19 is positioned in a substantially outermost region 10b on the right side of the vehicle body and protrudes forward from the right outrigger part 51 to a distance L1. The rear end part 19a is positioned so as to enter into the vehicle body from the outermost region 10b on the right side of the vehicle body to a distance W1.

Specifically, the right front side frame 19 is inclined inward in the width direction of the vehicle toward the rear of the vehicle body at an angle θ2. The angle θ2 is set so that the right front side frame 19 will clear the right front wheel support unit 32 (FIG. 2) and so that the engine compartment 66 can be accommodated.

The second floor frame part 73 has a front half region (referred to below as the "second front half region") 75 extending from the rear end part 19a of the right front side frame 19 to the center cross member 14, and a rear half region (referred to below as the "second rear half region") 76 extending from a rear end part of the second front half region 75 to the rear end part 41b of the left side frame 41.

The second front half region 75 is inclined inward in the width direction of the vehicle toward the rear part of the vehicle body at an angle θ3 and is bonded to a central part of the center cross member 14. The angle θ2 of the right front side frame 19 is greater than the angle θ3 of the second front half region 75. The two angles are related so that θ2>θ3.

The second rear half region 76 is inclined inward in the width direction of the vehicle toward the rear part of the vehicle body at an angle θ4. The angle θ4 of the second rear half region 76 is greater than the angle θ3 of the second front half region 75. The two angles are related so that θ4>θ3.

The rear end part of the second front half region 75 and the front end part of the second rear half region 76 form a second joint 77. The first joint 71 and second joint 77 form an X-shaped joint 78.

The center cross member 14 is composed of a left center cross member 81 extending between the left joint 50 of the left side floor frame part 47 and the joint 78, and a right center cross member 82 extending between the right joint 56 of the right side floor frame part 52 and the joint 78.

The left center cross member 81 and right center cross member 82 are linearly disposed in the width direction of the vehicle.

The bottom structure 10 for a vehicle body of the present embodiment has a triangular front frame part 58 formed into a shape that is triangular in a planar view by a side created by a rear half 18b of the left front side frame 18 and the first front half region 68, a side created by a rear half 19b of the right front side frame 19 and the second front half region 75, and a side created by the second front cross member 43.

The bottom structure 10 for a vehicle body additionally has a front rectangular frame part 59 formed into a shape that is substantially rectangular in a planar view by a side created by the left outrigger part 46 and the left front half region 48, a side created by the center cross member 14, a side created by the right outrigger part 51 and the right front half region 53, and a side created by the second front cross member 43.

The triangular front frame part 58 is formed on the front rectangular frame part 59, whereby the front rectangular frame part 59 is kept rigid. In other words, when the front part of the bottom structure 10 for a vehicle body is subjected to a lateral force, which is in the width direction of the vehicle, as indicated by the arrow A or B, the triangular front frame part 58 prevents the front rectangular frame part 59 from deforming in the width direction of the vehicle.

A triangular rear frame part 63 that is substantially triangular in a planar view is formed by a side created by the first rear half region 69, a side created by the second rear half region 76, and a side created by the rear cross member 44.

A substantially rectangular rear rectangular frame part 64 is formed by a side created by the left rear half region 49, a side created by the rear cross member 44, a side created by the right rear half region 54, and a side created by the center cross member 14.

The triangular rear frame part 63 is formed on the rear rectangular frame part 64, whereby the rear rectangular frame part 64 is kept rigid. In other words, when the rear part of the bottom structure 10 for a vehicle body is subjected to a lateral force, which is in the width direction of the vehicle, as indicated by the arrow C or D, the triangular rear frame part 63 prevents the rear rectangular frame part 64 from deforming in the width direction of the vehicle.

The rectangular framework 11 described above is composed of the front rectangular frame part 59 and the rear rectangular frame part 64. Thus, the front and triangular rear frame parts 58, 63 are formed on the rectangular framework 11, whereby the rectangular framework 11 is kept rigid.

The X-shaped frame member 12, which is a base for the front and triangular rear frame parts 58, 63, is a simple member formed into a substantially X-shaped configuration by the first and second frames 61, 62. Thus, merely providing the simple-structured X-shaped frame member 12 will allow deformation of the rectangular framework 11 to be minimized, the rigidity of the bottom structure 10 for a vehicle body to be increased, and the bottom structure 10 to be made lighter.

In FIG. 2, the left front wheel support unit 31 is composed of a left front wheel housing 84 and a left front suspension (e.g., left front damper, left front upper arm, or left front lower arm; not shown).

The left front wheel housing 84 is provided to the left front end part 12a, which is the front half part of the left front side frame 18, and is disposed to the outside of the left front end part 12a.

The left front wheel 36 is supported at the left front end part 12a of the left front side frame 18 via the left front wheel support unit 31.

The right front wheel support unit 32 is composed of a right front wheel housing 85 and a right front suspension (e.g., right front damper, right front upper arm, or right front lower arm; not shown).

The right front wheel housing 85 is provided to the right front end part 12b, which is the front half part of the right front side frame 19, and is disposed to the outside of the right front end part 12b.

The right front wheel 37 is supported at the right front end part 12b of the right front side frame 19 via the right front wheel support unit 32.

The left rear wheel support unit 33 is composed of a left rear wheel housing 86 and a left rear suspension (e.g., left rear damper, left rear upper arm, or left rear lower arm; not shown).

The left rear wheel housing 86 is provided to the left rear end part 12c of the X-shaped frame member 12 via the rear end part 41b of the left rear half region 49 of the left side frame 41. The left rear wheel housing 86 is disposed to the outside of the left rear half region 49.

The left rear wheel 38 supported at the rear end part 12c of the X-shaped frame member 12 via the left rear wheel support unit 33 and the rear end part 41b of the left rear half region 49.

The right rear wheel support unit 34 is composed of a right rear wheel housing 87 and a right rear suspension (e.g., right rear damper, right rear upper arm, right rear lower arm, or the like), which is not shown in the drawing.

The right rear wheel housing 87 is provided to the right rear end part 12d of the X-shaped frame member 12 via the rear end part 42b of the right rear half region 54 of the right side frame 42. The right rear wheel housing 87 is disposed to the outside of the right rear half region 54.

The right rear wheel 39 is supported at the rear end part 12d of the X-shaped frame member 12 via the right rear wheel support unit 34 and the rear end part 42b of the right rear half region 54.

The front impact absorption unit 16 comprises left and right front impact absorption frames 91, 92 extending toward the front of the vehicle body from the front end parts 12a, 12b of the left and right front side frames 18, 19 and a front bumper beam 93 extending between a front end part 91a of the left front impact absorption frame 91 and a front end part 92a of the right front impact absorption frame 92.

According to the front impact absorption unit 16, when the front bumper beam 93 is subjected to an impact from the front side of the vehicle body, the left and right front impact absorption frames 91, 92 deform (collapse) and absorb the impact.

The rear impact absorption unit 17 comprises left and right rear impact absorption frames 95, 96 extending toward the rear of the vehicle body from the rear end parts 41b, 42b of the left and right side frames 41, 42 and a rear bumper beam 97 extending between a rear end part 95a of the left rear impact absorption frame 95 and a rear end part 96a of the right rear impact absorption frame 96.

The rear end part 41b of the left side frame 41 is connected to the left rear end part 12c of the X-shaped frame member 12. The rear end part 42b of the right side frame 42 is connected to the right rear end part 12d of the X-shaped frame member 12. In other words, the rear impact absorption unit 17 is provided to the left and right rear end parts 12c, 12d of the X-shaped frame member 12 via the left and right rear end parts 41b, 42b.

According to the rear impact absorption unit 17, when the rear bumper beam 97 is subjected to an impact from the rear side of the vehicle body, the left and right rear impact absorption frames 95, 96 deform (collapse) and absorb the impact.

The absorption of an impact when the bottom structure 10 for a vehicle body is subjected to the impact shall be described next with reference to FIGS. 4A, 4B, 5A, and 5B.

Figure 4A:
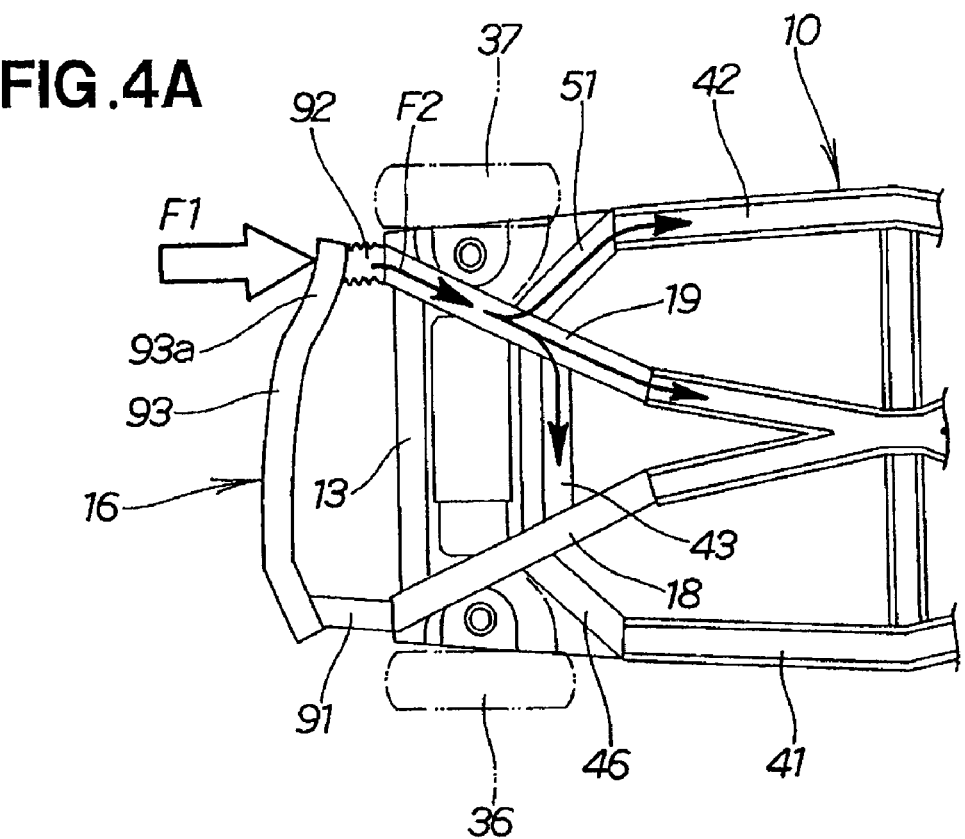

FIG. 4A shows an example in which the right front part of the bottom structure 10 for a vehicle body is subjected to an impact.

In FIG. 4A, when a right end part 93a of the front bumper beam 93 is subjected to an impact force F1 as indicated by the arrow, the right front impact absorption frame 92 collapses and absorbs some of the impact force, and the severity of the impact force acting upon the bottom structure 10 for a vehicle body is reduced by the front impact absorption unit 16.

Some of the impact force is absorbed by the right front impact absorption frame 92, whereby a remaining portion of the impact force F2 is conveyed to the right front side frame 19 as indicated by the arrow.

The impact force F2 conveyed to the right front side frame 19 is dispersed to the right outrigger part 51 of the right side frame 42 and to the second front cross member 43. For this reason, the impact force F2 conveyed to the right front side frame 19 can suitably be sustained by the bottom structure 10 for a vehicle body, and the bottom structure 10 can be kept rigid.

In FIG. 4A, an example is described in which the right end part 93a of the front bumper beam 93 is subjected to the impact force F1 as indicated by the arrow. However, this is not the only possibility, and the same effect is obtained when a left end part or central part of the front bumper beam 93 is subjected to the impact force F1.

Figure 4B:
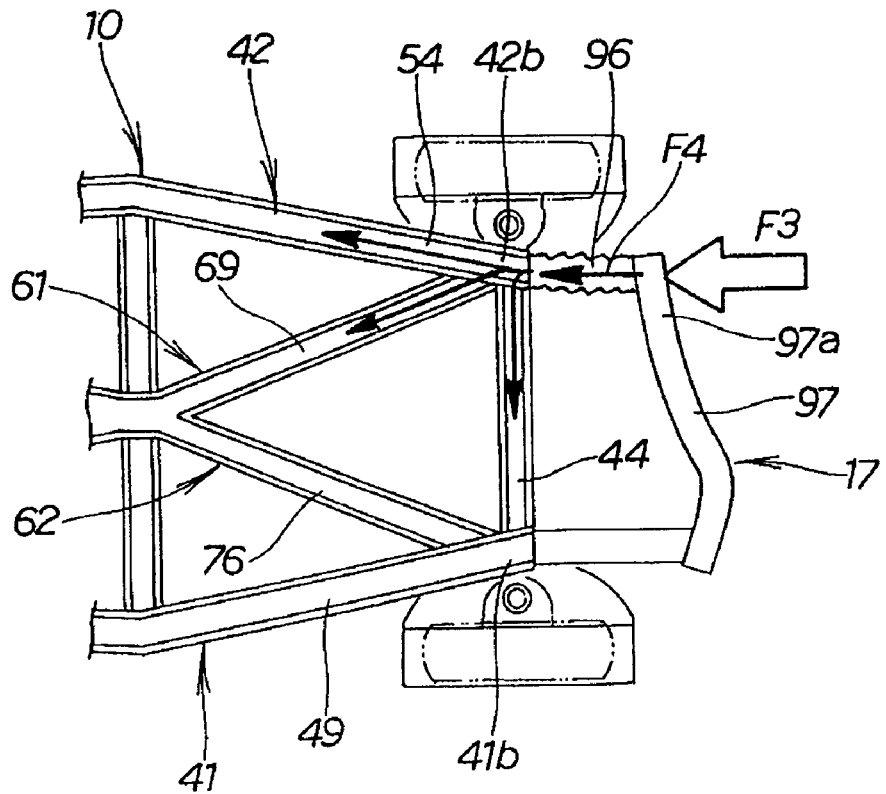
FIG. 4B is a schematic view similar to FIG. 4A but showing an impact force being absorbed and dispersed when a right rear part of the bottom structure for a vehicle body is subjected to the impact force.

When a right end part 97a of the rear bumper beam 97 is subjected to an impact force F3 as indicated by the arrow, the right rear impact absorption frame 96 collapses and absorbs some of the impact, and the impact force acting upon the bottom structure 10 for a vehicle body is reduced by the rear impact absorption unit 17, as shown in FIG. 4B.

Some of the impact force is absorbed by the right rear absorption frame 96, whereby a remaining portion of the impact force F4 is conveyed to the rear end part 42b of the right side frame 42 as indicated by the arrow.

The impact force F4 conveyed to the rear end part 42b is dispersed to the right rear half region 54 of the right side frame 42, the first rear half region 69 of the first frame 61, and the rear cross member 44. For this reason, the impact force F4 conveyed to the rear end part 42b of the right side frame 42 can be suitably sustained by the bottom structure 10 for a vehicle body, and the bottom structure 10 is kept rigid.

In FIG. 4B, an example is described in which the right end part 97a of the rear bumper beam 97 is subjected to the impact force F3 as indicated by the arrow. However, this is not the only possibility, and the same effect is obtained when a left end part or central part of the rear bumper beam 97 is subjected to the impact force F3.

Figure 5A:
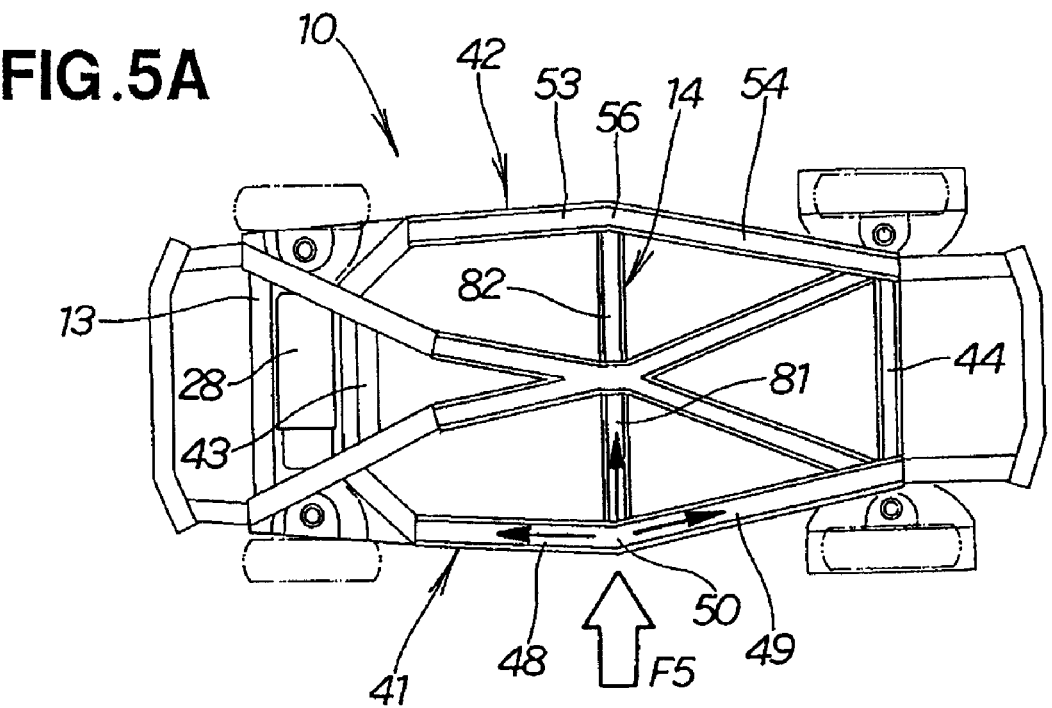

FIG. 5A shows an example in which the bottom structure 10 for a vehicle body is subjected to an impact in the lateral direction.

In FIG. 5A, when the joint 50 of the left side frame 41 is subjected to an impact force F5 as indicated by the arrow, the impact force F5 is dispersed to the left center cross member 81 of the center cross member 14 and the left front half region 48 and left rear half region 49 of the left side frame 41. For this reason, the impact force F5 conveyed to the joint 50 of the left side frame 41 can be suitably sustained by the bottom structure 10 for a vehicle body, and the bottom structure 10 is kept rigid.

In FIG. 5A, an example is described in which the joint 50 of the left side frame 41 is subjected to the impact force F5 as indicated by the arrow. However, this is not the only possibility, and the same effect is obtained when the joint 56 of the right side frame 42 is subjected to the impact force F5.

Figure 5B:
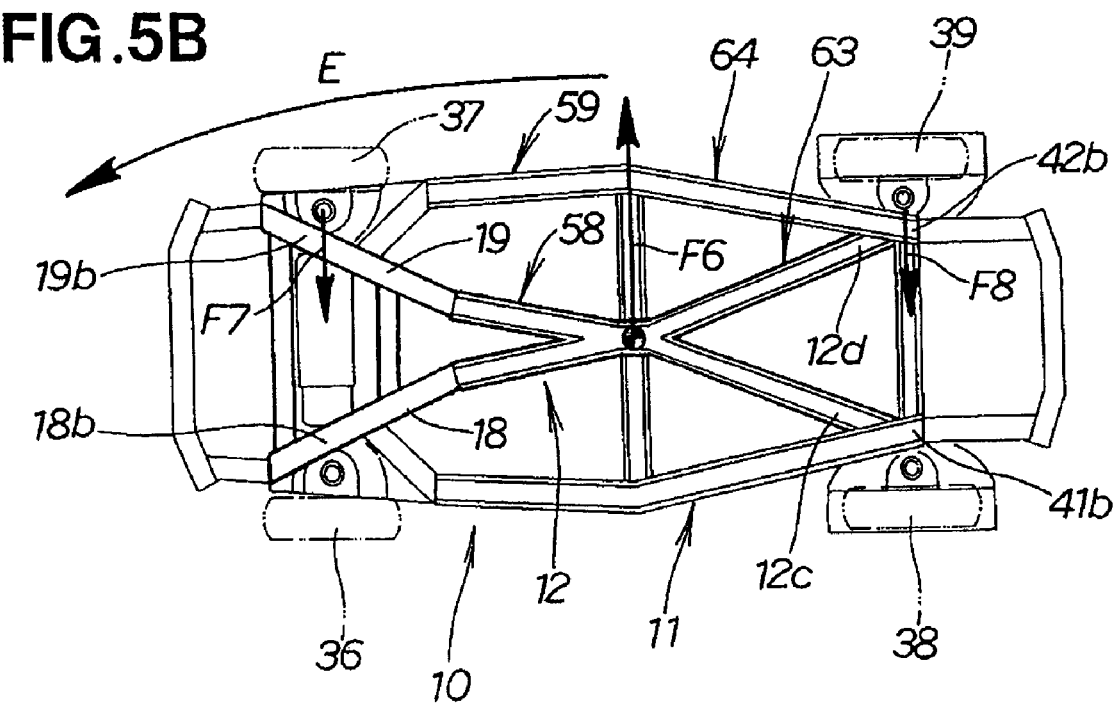
FIG. 5B is a schematic view similar to FIG. 5A but showing a force acting upon the bottom structure for a vehicle body from the front wheel and rear wheel when the vehicle turns while traveling.

As shown in FIG. 5B, when the vehicle makes a left turn while traveling as indicated by the arrow E, the bottom structure 10 for a vehicle body is subjected to a centrifugal force as indicated by the arrow F6. However, the left and right front wheels 36, 37 and left and right rear wheels 38, 39 support the bottom structure 10 so that the bottom structure 10 is not moved by the centrifugal force indicated by the arrow F6.

In such an event, the front part of the bottom structure 10 for a vehicle body is subjected to a load from the right front wheel 37 as indicated by the arrow F7. At the same time, the rear part of the bottom structure 10 is subjected to a load from the right rear wheel 39 as indicated by the arrow F8.

The load indicated by the arrow F7 acts in a direction whereby the front rectangular frame part 59 will be deformed in the width direction of the vehicle. However, the triangular front frame part 58 formed on the front rectangular frame part 59 prevents the front rectangular frame part 59 from deforming.

Similarly, the load indicated by the arrow F8 acts in a direction whereby the rear rectangular frame part 64 will be deformed in the width direction of the vehicle body. However, the triangular rear frame part 63 formed on the rear rectangular frame part 64 prevents the rear rectangular frame part 64 from deforming.

A bottom structure 110 for a vehicle body of a second embodiment shall be described next with reference to FIGS. 6 and 7. In the bottom structure for a vehicle body (*1) 110 of the second embodiment, members that are the same or similar to those of the bottom structure for a vehicle body (*1) 10 of the first embodiment are labeled using the same symbols, and descriptions thereof shall be omitted.

Figure 6:
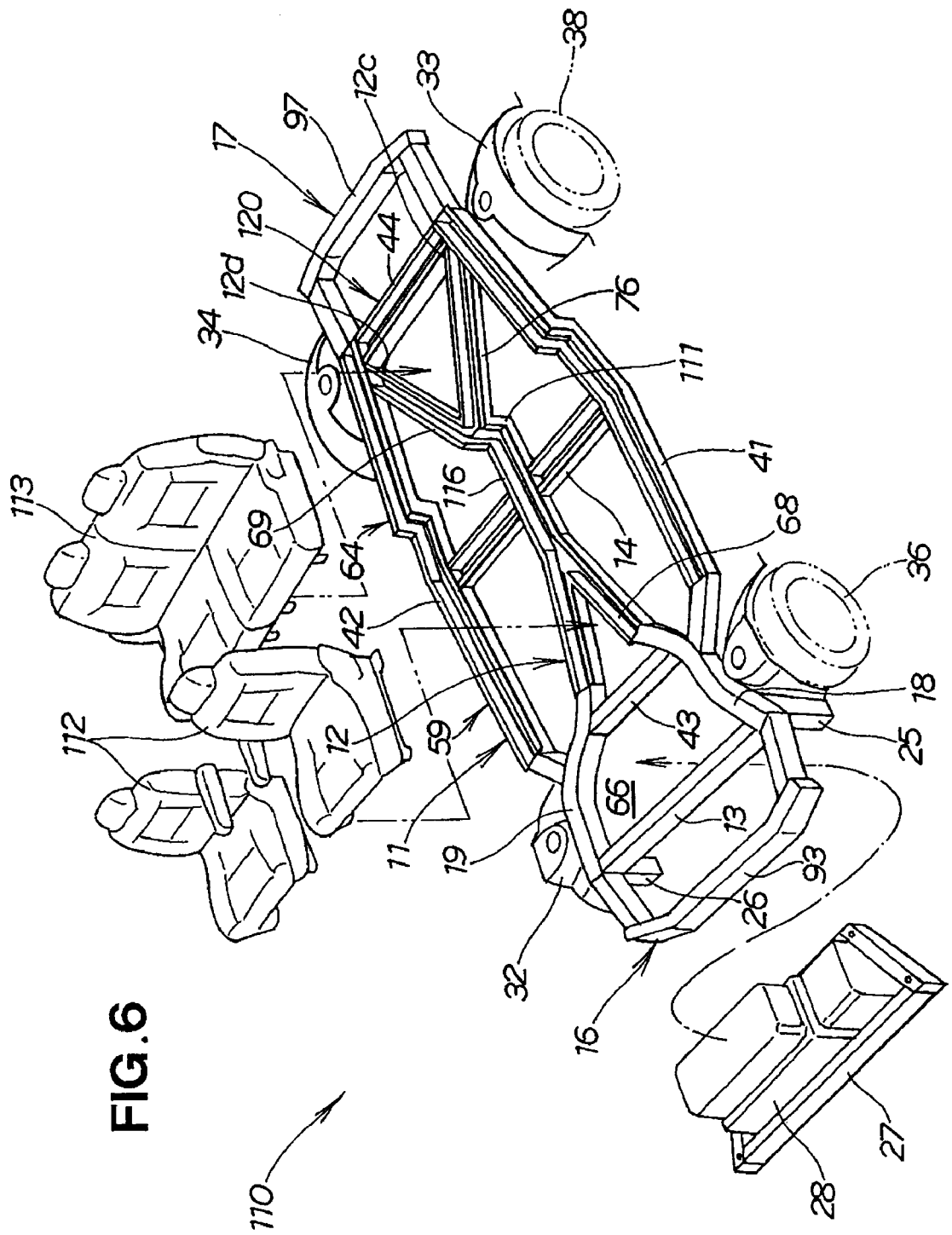
FIG. 6 is a perspective view showing a vehicle body bottom structure according to a second embodiment of the present invention.
Figure 7:
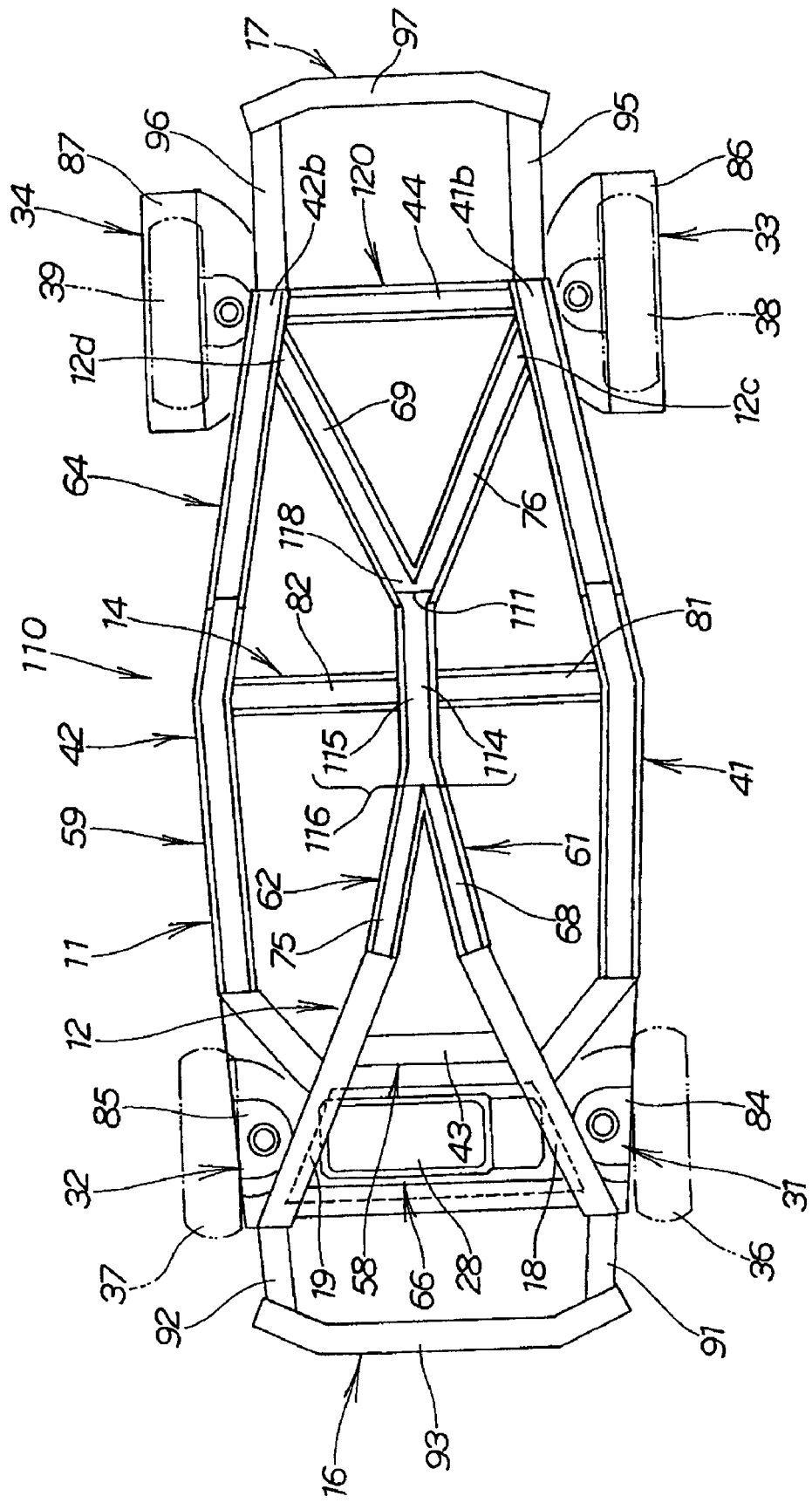
FIG. 7 is a top plan view showing the vehicle body bottom structure of FIG. 6.

The bottom structure 110 for a vehicle body shown in FIGS. 6 and 7 is an example in which a bump 111 is provided to the rectangular so as to be used with a floor panel (not shown) having a bump on a rear part.

The floor panel is mounted to the bottom structure 110 for a vehicle body, a pair of front seats 112, 112 is provided to a front end part of the floor panel, and a rear seat 113 is provided to a rear end part. The bottom structure 110 for a vehicle body of the second embodiment shown in FIGS. 6 and 7 can be applied to, for example, a sedan or another vehicle comprising a floor that has a bump at a rear part of a vehicle body.

A first joint 114 is formed by a rear end part of a first front half region 68 and a front end part of a first rear half region 69, as shown in FIG. 7. A second joint 115 is formed by a rear end part of a second front half region 75 and a front end part of a second rear half region 76. A linear joint 116 is formed by the first joint 114 and second joint 115.

The joint 116 is formed into a linear shape, whereby an intersection 118 between the first rear half region 69 and the second rear half region 76 can be moved rearward to the bump 111. In other words, a triangular rear frame part 120 that is formed into a triangular shape by a side created by the first rear half region 69, a side created by the second rear half region 76 and a side created by the rear cross member 44 is formed to the rear of the bump 111.

The area to the rear of the bump 111 is a region in which a flat floor is formed. The triangular rear frame part 120 is formed along the flat floor.

Thus, the triangular rear frame part 120 is formed on a rear rectangular frame part 64, whereby the rear rectangular frame part 64 can be kept rigid in the same manner as in the triangular rear frame part 63 (FIG. 3) of the first embodiment.

According to the above-described bottom structure 110 for a vehicle body of the second embodiment, the same effect is obtained as with the bottom structure 10 for a vehicle body of the first embodiment.

The cross sectional shapes of the rectangular framework 11, X-shaped frame member 12, first front cross member 13, center cross member 14, front impact absorption part 16 and rear impact absorption part 17 of the first and second embodiment can be arbitrarily selected from a closed cross-sectional shape, a concave cross-sectional shape, or another cross-sectional shape.

Obviously, various minor changes and modifications of the present invention are possible in light of the above teaching. It is therefore to be understood that within the scope of the appended claims the invention may be practiced otherwise than as specifically described.

What is claimed is:

1. A bottom structure for a vehicle body, comprising:
  a rectangular framework having a substantially rectangular shape, the framework being comprised of left and right side frames extending longitudinally of the vehicle body, a front cross member extending between front end parts of the left and right side frames, and a rear cross member extending between rear end parts of the left and right side frames;

an X-shaped frame member comprised of a first frame extending from the front end part of the left side frame to the rear end part of the right side frame toward the rear of the vehicle body, and a second frame extending from the front end part of the right side frame to the rear end part of the left side frame toward the rear of the vehicle body in such a manner as to intersect in a substantially X-shaped configuration in the rectangular framework;

left and right front wheel support units provided to left and right front end parts of the X-shaped frame member for supporting left and right front wheels; and left and right rear wheel support units provided to left and right rear end parts of the X-shaped frame member for supporting left and right rear wheels, wherein the left and right front end parts of the X-shaped frame member comprise a front impact absorption unit for absorbing an impact received from a front side of the vehicle body, and the left and right rear end parts of the X-shaped frame member comprise a rear impact absorption unit for absorbing an impact received from a rear side of the vehicle body.

* * * * *